United States Patent [19]

Möllenkamp

[11] Patent Number: 4,925,001

[45] Date of Patent: May 15, 1990

[54] DEVICE FOR SUPPLYING GROUPS OF FILLED AND CLOSED CONTAINERS TO A DOWNSTREAM TREATMENT DEVICE

[75] Inventor: Daniël L. Möllenkamp, Amsterdam, Netherlands

[73] Assignee: Stork Amsterdam B.V., Netherlands

[21] Appl. No.: 192,933

[22] Filed: May 12, 1988

[30] Foreign Application Priority Data

May 13, 1987 [NL] Netherlands ............... 8701150

[51] Int. Cl.$^5$ ............................................. B65G 47/24
[52] U.S. Cl. .................................. 198/412; 198/459; 198/467.1
[58] Field of Search ............... 198/411, 412, 459, 461, 198/408, 413, 467.1, 425

[56] References Cited

U.S. PATENT DOCUMENTS

| | | | |
|---|---|---|---|
| 2,538,408 | 1/1951 | Baker et al. | 198/412 X |
| 3,212,619 | 10/1965 | Mödder | 198/412 |
| 3,292,768 | 12/1966 | Mattews | 198/467.1 X |
| 3,314,519 | 4/1967 | Kelly | 198/467.1 X |
| 4,265,357 | 5/1981 | Amberg et al. | 198/467.1 X |
| 4,660,708 | 4/1987 | Willerding | 198/459 X |

FOREIGN PATENT DOCUMENTS

| | | | |
|---|---|---|---|
| 2145599 | 5/1972 | Fed. Rep. of Germany | 198/408 |
| 1363024 | 7/1962 | France | 198/412 |
| 75728 | 4/1986 | Japan | 198/459 |
| 1424344 | 2/1976 | United Kingdom | 198/412 |

Primary Examiner—Robert J. Spar
Assistant Examiner—Cheryl L. Gastineau
Attorney, Agent, or Firm—Arnold S. Weintraub; Gerald R. Black

[57] ABSTRACT

Device for supplying groups of filled and closed containers to a downstream treatment device comprises a supply track, a distribution member for aranging the containers at a distance from each other, a tilting device, a downstream transport track and a finger track extending along at least a section of the transport track for moving a certain number of containers present on the transport track to the treatment device. The tilting device comprises a positively driven FERRIS$_R$ wheel, or a positive-driven tilting wheel device. The transport track, the finger track and the FERRIS$_R$ wheel, or a positive-driven tilting wheel device are each coupled, via their own transmission, to a common drive. The transmission ratio of the transmissions between the common drive and the transport track, the finger track and the FERRIS$_R$ wheel, or a positive-driven tilting wheel device, respectively, is such that the speed of the finger track during operation is higher by a certain factor than the speed of the transport track and the containers arrive on the transport track with a predetermined spacing. With the device of the invention an optimal filling of the treatment device is achieved.

6 Claims, 1 Drawing Sheet

U.S. Patent
May 15, 1990
4,925,001
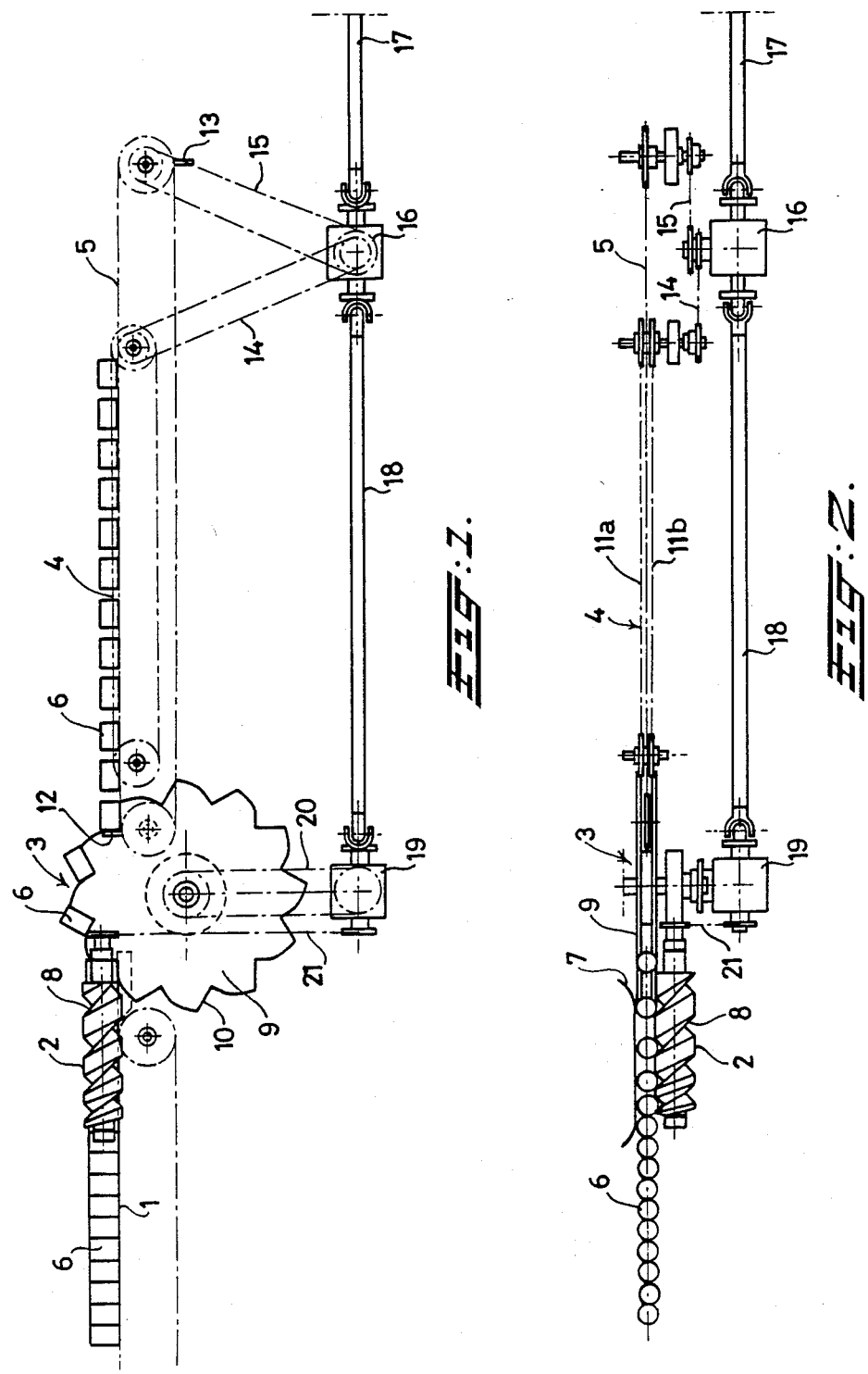

DEVICE FOR SUPPLYING GROUPS OF FILLED AND CLOSED CONTAINERS TO A DOWNSTREAM TREATMENT DEVICE

BACKGROUND OF THE INVENTION

The invention relates to a device for supplying groups of filled and closed containers to a downstream treatment device, comprising a supply track, a distribution member for arranging the containers at a distance from each other, a tilting device, a downstream transport track and a finger track extending along at least a section of the transport track for moving a certain number of containers present on the transport track to the treatment device.

In a known device of this type, the containers are supplied standing upright on the supply track. A turnstile which ensures that the containers on the supply track are arranged a certain distance from each other is arranged at the end of the supply track. From the supply track the containers arrive on a tilting track, downstream from the supply track, on which the containers are brought from the upright position into a horizontal position. The containers in the horizontal position are transported further by means of the transport track in the direction of the treatment device. The finger track, i.e. a track which is provided with one or more fingers projecting between the containers on the transport track, extends along the end section of the transport track. When the front container of a row of containers on the transport track has reached the end of the transport track, which is signalled by means of a sensor, the container which at that instant is present immediately in front of the area over which the finger track extends on the transport track, is restrained for a short time. As a result an additional space is provided between this container and the container lying in front of it on the transport track, in which space a finger of the finger track positions itself. Due to the fact that the finger track runs at a greater speed than the transport track (about 1.5 times as great), the row of cans present on the end section of the transport track are carried along by these fingers and pushed off the transport track into the treatment device. This process is repeated when the container which has been restrained earlier for a short time has reached the end of the transport track.

The above-described device has, however, a number of drawbacks. In view of the fact that the mutual distance between the containers on the transport track is not constant, which is a consequence of the manner in which the containers are tilted on the tilting track, the supply of the containers has to be adjusted in a manner such that the average number of containers pushed into the treatment device per cycle is smaller than the maximum number of containers which the treatment device will be able to accept in each cycle. This is to prevent the number of containers pushed in at a given instant from being larger than the capacity of the treatment device. This means that the treatment device is not optimally filled. Furthermore, due to the transport track being of necessity fairly long and due to the presence of the tilting track, the overall length of the device is fairly large and the device occupies a comparatively large amount of space. The device is moreover of fairly complicated construction and comprises many components of which of larger number are moreover designed to be movable. This results in the device being expensive. It is an additional disadvantage that the containers fall over when they are tilted, which may be disadvantageous in the case of glass containers.

SUMMARY OF THE INVENTION

It is the object of the present invention to overcome the above-mentioned drawbacks.

This object is achieved with a device of the above-mentioned type which is characterized in that the tilting device comprises a positively driven FERRIS ® wheel, or a positive-driven tilting wheel device and the transport track, the finger track and the FERRIS ® wheel, or a positive-driven tilting wheel device are each coupled, via their own transmission, to a common drive, the transmission ratio of the transmissions between the common drive and the transport track, the finger track and the FERRIS ® wheel, or a positive-driven tilting wheel device, respectively, being such that the speed of the finger track during operation is higher by a certain factor than the speed of the transport track and the containers arrive on the transport track with a predetermined spacing.

By using a positively driven FERRIS ® wheel, or a positive-driven tilting wheel device which takes up, one by one, the containers supplied in upright position on the supply track, tilts them through about 90° and deposits them in a horizontal position, the result is achieved with a simple tilting device that, at a certain value of the transmission ratios, the number of containers per group of containers to be moved by the finger track to the treatment device is always the same. This makes it possible for the average number of containers which is pushed per cycle into the treatment device to be made the same as the maximum number of containers, so that optimal filling of the treatment device is achieved and no filling loss occurs. Due to the very accurate positioning of the containers on the transport track and the synchronized drive of the FERRIS ® wheel, or a positive-driven tilting wheel device, transport track and finger track, it is possible to make the finger track directly adjoin the tilting device and to omit a device for temporarily restraining a first container of a group. As a result, the entire device can be of compact and simple design. A tilting device with a FERRIS ® wheel, or a positive-driven tilting wheel device has the further advantage that filled containers are not exposed during tilting to shock or impact loads, this being particularly advantageous in the case of glass containers.

In order to be able to vary the number of containers in a group of containers to be displaced by the finger track to the treatment device, the ratio between the magnitude of the transmission ratio of the transmissions between the common drive and the transport track and the FERRIS ® wheel, or a positive-driven tilting wheel device, respectively, is adjustable. By reducing or increasing the rotation speed of the FERRIS ® wheel, or a positive-driven tilting wheel device while the speed of the transport track and finger track remains a constant the number of containers in a group of containers on the transport track to be moved by the finger track can be reduced or increased.

In an advantageous embodiment of the device according to the invention, the distribution member consists of a varable-pitch worm screw which is arranged next and parallel to the supply track and can interact with containers present on the supply track and the rotation speed of which is adapted to match the speed of the FERRIS® wheel, or a positive-driven tilting wheel device. Using such a variable-pitch worm screw, the containers present on the supply track can be arranged at the desired distance from each other in a very uniform manner without the containers being exposed to shock or impact loads.

The invention will hereinafter be explained in detail with reference to an exemplary embodiment and with the aid of the drawings.

BRIEF DESCRIPTION OF THE DRAWINGS

FIG. 1 is a diagrammatic side view of the device according to the invention; and FIG. 2 is a top view of the device of FIG. 1.

DESCRIPTION OF THE PREFERRED EMBODIMENT

FIGS. 1 and 2 diagrammatically show a device for supplying groups of filled and closed containers to a downstream treatment device. The treatment device may be, for example, a sterilization device. Such a device is usually provided with a large number of sleeves or grooves which move through the device and in which the containers to be treated have to be placed. Each groove or sleeve may contain a given number of containers. The present device thus serves to push containers, supplied via a supply track, into the grooves or sleeves of the treatment device.

The device represented in the drawing comprises a supply track 1, a distribution member 2, a tilting device 3, a downstream transport track 4 as well as a finger track 5. The containers to be treated, which usually have a cylindrical shape, are supplied in upright position by the supply track 1. The distribution member 2 in the form of a variablepitch worm screw ensures that the containers 6 standing on the supply track are arranged at a certain distance from each other in the direction movement. This takes place by the containers, which are supported by a guide 7 on the side opposite the worm screw 2, being guided through the flanks of the groove 8 in the worm screw 2.

The tilting device 3 arranged behind the supply track 1 consists of a so-called FERRIS® wheel, or a positive-driven tilting wheel device 9. This is a wheel which is provided at its circumference with recesses 10 in which a container 6 can be received. The containers standing on the supply track 1 are taken up one by one by means of this FERRIS® wheel, or a positive-driven tilting wheel device and tilted through an angle of about 90° so that they are brought into the horizontal position. Tilting thus takes place without the containers 6 being exposed to impact or shock loads. In the horizontal position, the containers are first deposited by the FERRIS® wheel, or a positive-driven tilting wheel device on the finger track 5 arranged behind the FERRIS® wheel, or a positive-driven tilting wheel device and adjoining the latter, and are subsequently passed on by the finger track 5 to the transport track 4 running parallel to the finger track.

The transport track 4 which consists of two belts or cables 11a and 11b running parallel to each other ensures the further transport of the containers 6 in the direction of the treatment device. The finger track 5 consists of a chain provided with two fingers 12 and 13 and extends over the entire length of the transport track 4 between 30 the two belts or cables 11a and 11b thereof. In the embodiment shown here, the finger track 5 extends both at the start and at the end of the transport track 4 beyond the transport track. The finger track 5 is arranged in a manner such that a finger 12 or 13 can engage behind one of the containers present on the transport track 4.

The transport track 4 and the finger track 5 are driven via a transmission 14, a transmission 15 and via a gearbox 16 by a common drive shaft 17. The drive shaft 17 at the same time drives, via the gearbox 16, a linking shaft 18, a gearbox 19 and transmissions 20 and 21, the FERRIS® wheel, or a positive-driven tilting wheel device 9 and the worm screw 2, respectively. The magnitude of the transmissions 14 and 15 is such that the speed of the finger track 5 during operation of the device is higher by a certain factor (for example 1,5) than the speed of the transport track 4. This achieves the result that a group of containers 6 lying on the transport track 4 is pushed by one of the fingers 12, 13 along the transport track in the direction of the treatment device at a speed which is higher than the speed of said transport track 4.

The speed of the finger track 5 is related to the cycle time of the treatment device, i.e. every time a groove or sleeve of the treatment device is present at the height of the end of the finger track 5, a group of containers 6 lying on the transport track 4 is pushed into said groove or sleeve by the finger 12 or 13 of the finger track 5. Due to the finger track 5 being provided with two fingers 12, 13 which are separated from each other by half the length of the chain of the finger track, when one finger has reached the groove or sleeve of the treatment device at the end of the finger track, the other finger will be present at the start of the finger track at the FERRIS® wheel, or a positive-driven tilting wheel device 9.

The speed of the FERRIS® wheel, or a positive-driven tilting wheel device and the speed, matched thereto, of the worm screw 2, are adjustable, with the speed of the transport track 4 and the finger track 5 remaining the same, in particular in steps of 1/n times the nominal speed of the FERRIS® wheel, or a positive-driven tilting wheel device, n being the number of recesses in the Ferris wheel and the nominal speed being the speed at which n containers are deposited on the finger track 5 and the transport track 4, respectively, between the two fingers 12, 13 of the finger track 5. The adjustment speed of the FERRIS® wheel, or a positive-driven tilting wheel device may be carried out in, for example, the gearbox 19, but may also be carried out in a different manner. By varying of the speed of the FERRIS® wheel, or a positive-driven tilting wheel device 9, the pitch distance between the containers 6 on the transport track 4 and, hence the number of containers present between the two fingers 12, 13 on the transport track 4, can be varied. The number of containers per groove or sleeve in the treatment device can be varied in this manner, depending on the height of the containers, so that a groove or sleeve is always optimally filled.

The advantages of the above-described device according to the invention can be summarized as follows:
the number of containers per groove or sleeve of the treatment device is optimal and can be varied in a simple manner,
the device takes up considerably less space than the known device,
the device is of simple construction,
the containers are treated "more gently".
What is claimed is:

1. A device for supplying groups of filled and closed containers to a downstream treatment device, the device, comprising:
   (a) a supply track, the containers being supplied by the supply track in a first position and in a closed relationship relative to each other for subsequent treatment;
   (b) a distribution member which receives the containers disposed on the supply track, and separates the containers at a distance from each other;
   (c) a positive-driven tilting wheel device, the positive-driven tilting wheel device having recesses disposed about the circumference for receiving containers, the containers being supplied to the positive-driven tilting wheel device from the distribution member spaced apart from each other, the positive-driven tilting wheel device being coupled to a first device;
   (d) a downstream transport track which receives the containers from the positive-driven tilting wheel device disposed in a second position, the containers arriving on the downstream transport track with a predetermining spacing, the downstream transport track being coupled to the first drive; and
   (e) a finger track extending along at least a section of the downstream transport track for moving the containers present on the downstream transport track to the downstream treatment device, the finger track being coupled to the first drive, the speed of the finger track being greater by a certain factor than the speed of the downstream transport track.

2. A device according to claim 1, wherein the ratio of the speed of the downstream transport track relative to the positive-driven tilting device is adjustable.

3. A device according to claim 1, wherein the distribution member is a variable-pitch worm screw, the worm screw being adjacent and parallel to the supply track, the worm screw interacting with containers present on the supply track, and the rotational speed of the worm screw substantially matching the speed of the positive-driven tilting wheel device.

4. The device according to claim 1, wherein the containers are engaged with the tilting wheel device through an angular rotation of about ninety degrees.

5. The device according to claim 1, wherein the containers are disposed in an upright position on the supply track, and the tilting wheel device disposes the containers in a non-upright position on the downstream transport track.

6. The device according to claim 1, wherein the distance between adjacent containers on the supply track is essentially constant.

* * * * *